April 6, 1948.    V. E. PRATT ET AL    2,439,055
OPTICAL SYSTEM FOR MICROFILM APPARATUS
Filed May 15, 1945    2 Sheets-Sheet 2
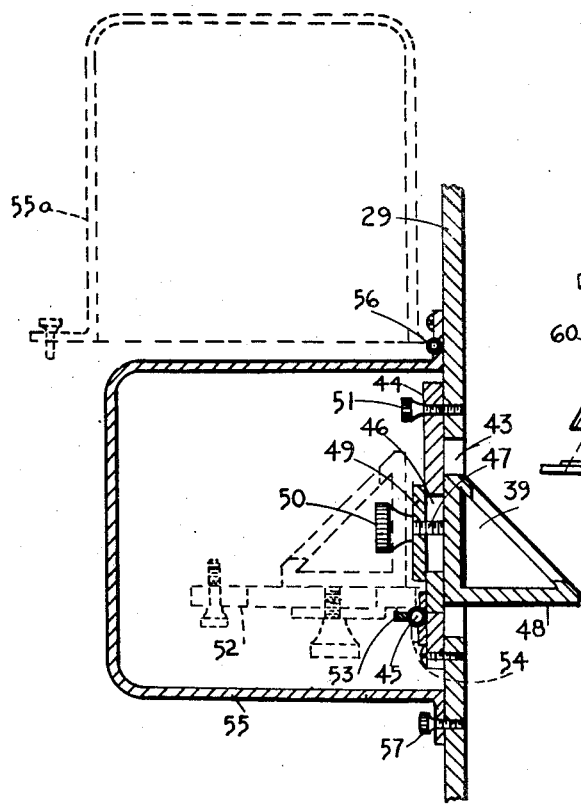
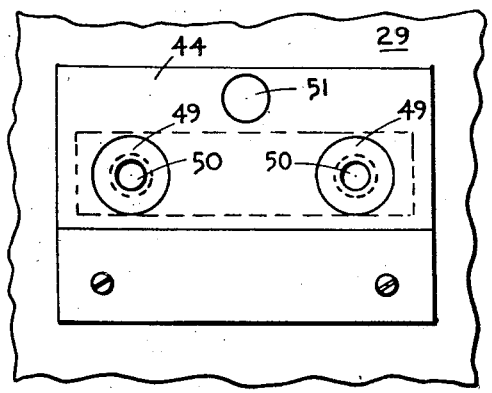
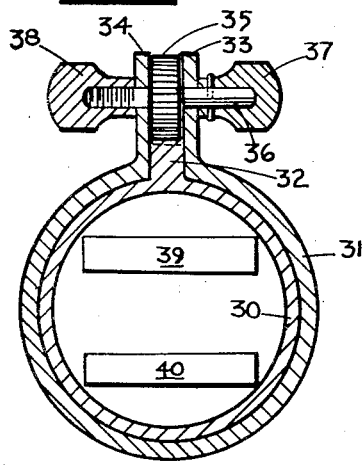
INVENTOR.
VERNEUR E. PRATT
GEORGE F. GRAY
BY
ATTORNEYS Patented Apr. 6, 1948

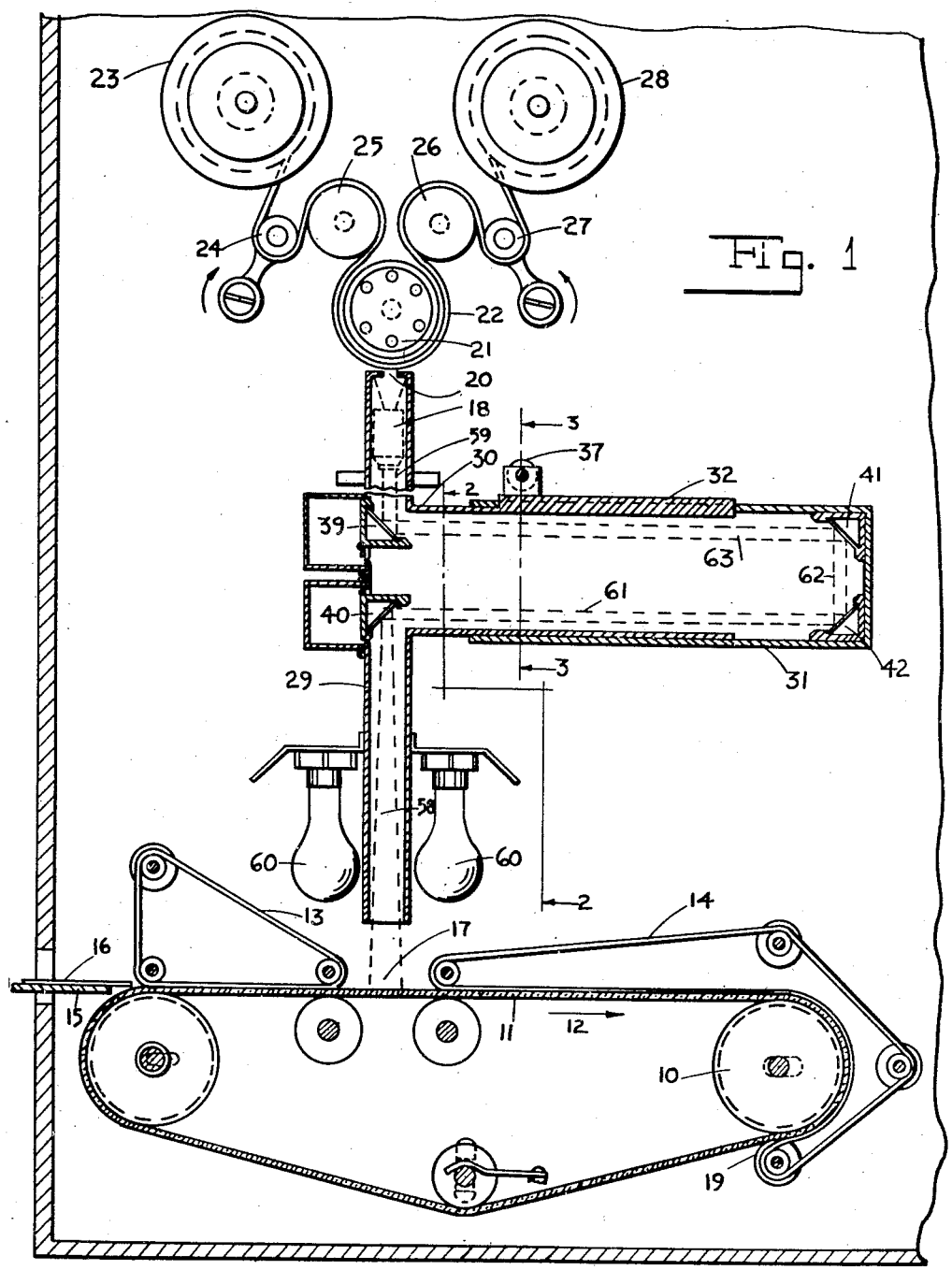

2,439,055

UNITED STATES PATENT OFFICE 2,439,055

OPTICAL SYSTEM FOR MICROFILM APPARATUS

Verneur E. Pratt and George F. Gray, Norwalk, Conn.

Application May 15, 1945, Serial No. 593,891

5 Claims. (Cl. 88—24)

This invention relates to optical system for microfilm apparatus, and is particularly applicable to flow type microfilming cameras as described in the co-pending application Serial Number 507,939, dated October 28, 1943, entitled "Photographic devices and method of operating same," now Patent No. 2,435,099, issued January 27, 1948.

Cameras of this type are customarily housed in a fixed size outer cabinet, and the "throw" or distance between the "copy" or documents being microfilmed and the lens and the film of the camera is fixed, and no provision is made whereby it can be easily adjusted. Such an adjustment would be difficult and expensive to devise, and requires that other adjustments (more fully referred to later herein) be made in the relative speed of the copy and film in order to produce microfilm of critical definition. This will be more readily understood by comparing this type of camera with cameras such as that disclosed in Patent No. 2,369,247, dated February 13, 1945, in which the camera head carrying the lens and film is readily adjusted relative to the copy, and is provided with a focusing motor and scale to set the lens focus.

The problems hereafter discussed, and which it is the object of the instant invention to solve, do not arise in connection with the type of cameras shown in the aforesaid patent, but are serious in connection with cameras of the type disclosed in the aforesaid application for reasons that will more fully hereinafter appear, and it will be understood that when "cameras" are hereafter referred to, they are of the fixed focus flow type shown in the aforesaid application.

In cameras housed in fixed size cabinets, it is customary to change lenses whenever it is desirable to alter the reduction ratio. If a large image is desired, then a lens of relatively long focal length is used; if smaller images are desired, then lenses of shorter focal length are necessary.

One of the objects of the invention is to so arrange the optical system of the camera, (and particularly the light tunnel encompassing the revertive light path through which the image of the flowing copy is taken to the lens and thence to the light sensitive emulsion on the film), so as to provide means for varying the length of this path between the copy and the lens, whereby the length of this path can be increased or diminished in order that one lens may do the work of an assortment of lenses to produce microfilm images of a variety of reduction ratios, say from 10 to 40 diameters, these two reduction ratios representing at the present stage of the art, high and low reductions.

A further object of the invention is to facilitate the construction and adjustment of flow cameras of the type described in the aforesaid application where alterations in the length of the optical path are necessary to correct for the failure of the selected lens to exactly correspond to its indicated focal length.

It is well known that lens makers are unable to produce large quantities of lenses of a given type (especially for microfilm work) and preserve throughout the manufactured lot a critical tolerance as to focal length. In any given lot of lenses assumed to be of 40 mm. focal length, optical bench inspection will usually show that such lenses vary in focal length from 39 mm. to 41 mm. This is a difference of 2½%, and while closer accuracy can be secured by very careful assembly and adjustment of the component parts of each lens, using selected or "matched" components, any demand made upon the lens manufacturer that he hold all lenses in a given lot to close tolerances so they will be practically the same in focal length, greatly increases the cost of the individual lens.

In order to understand how the instant invention accomplishes the object of facilitating the construction and assembly of cameras of the type described, it may be pointed out that a camera designed to employ, for example, a lens having a focal length of 40 mm. and a selected fixed "throw" or distance from the copy or focal plane to the film has a fixed drive ratio from the motors driving the copy feeder and the film, calculated from the ratio of the front focus to the back focus of the lens.

If, by chance, the supposed 40 mm. lens upon optical bench inspection proves to be only 39½ mm. focal length, the fixed ratio, or synchronization, of the drives for the film and the copy conveyor or feeder no longer apply, and the result is a microfilm image which is "out of flow" in that either the copy or the film is moving too fast.

To change the belt sheaves, gears, or other driving means is expensive, and on a production line assembly of such flow type cameras, almost an impossible operation. For example, in a camera using a belt drive copy feeder and film, such as that described in the aforesaid co-pending application, it might be necessary to vary the diameter of the driving pulleys a few thousandths of an inch. In order to determine what change must be made from the standard diameter, (which gives critically exact definition with a 40 mm. focus lens), it would be necessary with a lens not 40 mm. focus to assemble a complete camera and run a film through, then change the pulley diameters if they were too large, or put on larger pulleys if they were too small.

This "cut and try" method of assembly would have to be carried out with every camera in which the focal length of the lens deviated from the standard for which the ratio system of the drives for the film and the copy were designed, and means practically a difficult and expensive engineering job on each camera.

Commercially, at present this variation in focal lengths of the lens is recognized, but in most manufactured flow type cameras, unless the variation is more than 2% or 3%, no attempt is made to correct the driving ratio, and the result is that microfilm produced on such cameras does not have images of critically exact definition.

It is, therefore, a further object of this invention to provide an optical system for cameras of the type described in which critically exact definition can be obtained with lenses of varying focal length without changing the mechanical distance between the lens and the focal plane of the camera, and without varying the ratio system of the drives for the film and the copy conveyor therein.

The instant invention permits of altering the length of the optical path from the flowing copy to the flowing film to compensate for slight differences in the focal length of individual lenses in a commercial lot of lenses supposedly of the same focal length, but actually differing from each other, and provides an easy and exact means to compensate for slight oversized and undersized driving gears, belt sheeves, and other driving means.

A further object of the invention is to provide optical means for compensating for wear in the driving gears, belt sheeves, and other driving means employed in cameras of the type described.

If the gears or belt sheeves driving the copy carrier are slightly undersize, then the copy will progress too rapidly, and the ratio between the flowing copy and the flowing film is destroyed. In the present invention this can be compensated for by a slight shortening or lengthening of the optical path between the relative fixed lens and copy.

Further objects and advantages of the invention will be evident from the following specification and drawings, wherein by way of illustration the invention is shown as applied to a flow camera fully described in detail in the co-pending application before mentioned.

In the accompanying drawings:

Figure 1 is a vertical sectional diagrammatic view of a flow camera embodying the invention;

Figure 2 is a view partly in section on the line 2—2 of Figure 1;

Figure 3 is a sectional view on the line 3—3, Figure 1;

Figure 4 is a detailed view partly in section of one of the reflecting surfaces such as a prism or the like, as used in Figure 1, showing the adjustable mounting thereof; and Figure 5 is a front view of the device, Figure 4, with the cover removed.

Figure 1 shows, in diagrammatic form, the elements of a flow camera as more fully described in the co-pending application aforesaid, and as the structural features of such a flow camera can be varied within wide limits when practicing the instant invention, no attempt will be made herein to describe such parts, but only such description will be given as is necessary to enable the instant invention to be applied to such cameras.

The numeral 10 denotes sheeves or pulleys which are driven by a motor (not shown) to move belts 11 in the direction of the arrow 12, and on top of these belts is placed the idler belts 13 and 14. The document feed table for the copy is indicated at 15 and documents, one of which is shown at 16, are fed into the belts and are carried across the space 17 (which is in the focal plane of the lens 18), and then grasped between the opposed surfaces of belts 11 and 14 and carried around the pulleys 10 and discharged at 19.

A lens support has the usual slit 20 which is positioned below the freely rotatable drum 21 which carries the film 22. This film passes from the delivery reel 23 around the idler pulleys 24, drum 21, pulleys 25, 26, and 27 to the take-up reel 28. The pulley 26 is motor driven.

The pulleys 10 of the document feeder and pulley 26 of the film feed are driven in timed relation by belts, gears, or the like, as more fully described in the aforesaid co-pending application, and the relative speed at which the copy 16 traverses the focal plane or field 17 of the lens 18, and the speed at which the film 22 is carried past the slit 20 is definitely timed in accordance with the focal length of the lens.

The mechanism is so designed and constructed that the space between the lens 18 and the belt 11 constituting the optical path between the lens and focal plane or copy is mechanically fixed.

Extending transversely of the copy feeder belt 11 and extending upwardly therefrom is a light tunnel 29 which encompasses the optical path between the lens and the focal plane in which the copy is positioned.

The casing of this light tunnel 29 has an apertured side to which is secured the horizontal casing 30 upon which is mounted an extension 31. The casing 30 has an upstanding rack 32 secured thereto and the tubular casing 31 is split to receive this rack, as shown in Figure 3. The upstanding ears 33, 34 of the outer casing 31 carry a pinion 35 secured to the shaft 36, which by means of knob 37 secured thereto, may be rotated, thereby moving the outer casing 31 horizontally back and forth on the inner casing 30, similar to the draw tube of a telescope. By means of the locking nut 38, the ears 33, 34 are clamped on the pinion 35, thereby locking casings 30, 31 together at any designated point.

Secured in the side wall of the light tunnel 29 are two reflecting surfaces 39, 40. These may be prisms, mirrors, or the like, and these are adjustably positioned in the wall of the light tunnel 29, as hereafter more fully described.

In the outer end of the movable casing 31 is placed two additional light reflecting members 41, 42, which may be adjustably mounted in the end of said casing, same as the members 39, 40.

The reflecting members 39 to 42, inclusive, are preferably mounted on their supporting structure, so that they can be swung outwardly. This permits the first object of this invention to be achieved; namely, it provides means for varying the length of the optical path between the copy and the lens, whereby the length of this path can be reduced to a minimum so that short focus lenses can be used, and this also permits the reflecting surfaces to be readily cleaned without changing any of the adjustments.

These mountings are shown in detail in Figures 4 and 5, wherein 29 is the rear wall of the light tunnel having an opening 43 therein, which is covered by a plate 44 hinged at 45 to the wall of the light tunnel.

The plate 44 has two apertures or a slot therein, as indicated at 46, adapted to receive two threaded stems 47 secured to the holders 48 of the light reflecting members, one of which is shown at 39. The holes or slots 46 are covered by plates or washers 49. Knurled thumb nuts 50 are provided for engaging the threaded stems 47.

It will now be seen that by loosening the nuts 50, the holders 48 may be shifted about on the plates 44 and the reflecting surfaces can be adjusted in the optical path as may be necessary. When properly adjusted, the nuts 50 are tightened and the holders and reflecting surfaces are thereby fixedly positioned in respect to plate 44, and this plate, by means of the knurled thumb nut 51, may be locked to the wall of the light tunnel 29.

When it is desired to shorten the path between the focal plane and the lens of the camera, nut 51 is loosened and the entire assembly just described is moved outwardly to a position shown in dotted lines at 52 in Figure 4. The ear 53 comes in contact with the hinged plate, as shown at 54, thus holding the light reflecting surface in a position where it can be easily cleaned and inspected.

A cover 55 surrounds and encloses the assembly just described. This may be hinged at 56 to the side wall of the light tunnel and may be locked in place by a thumb screw 57. This cover can be raised to the position shown in dotted lines 55ª, Figure 4, to permit access to the assembly. When the assembly is in the outer position, as shown by dotted lines at 52, it is enclosed and protected, and when in the position where the mirror prism 39 is within the light tunnel 29, the casing 55 prevents the ingress of light at the hinge 45 and encloses and protects the thumb nuts 50, 51 from being disturbed.

The assembly, Figures 4 and 5, has been shown as applied to the upper reflecting surface 39 of Figure 1, but it will be obvious how this same assembly can be applied to any of the other light reflecting surfaces 40 to 42, inclusive, or any two surfaces such as 39, 40, can be combined on a single plate 44. Such slight modifications as are necessary to apply these assemblies to the outer end of the casing 31 will be obvious.

When the light reflecting surfaces 39 to 42 are thrown outwardly to the dotted line position 52 in Figure 4, a straight uninterrupted optical path exists between the lens 18 and the copy in the focal plane at 17, thereby permitting the first object herein stated to be attained. That is to say, a short focus lens can be used. When this is done, the total length of the optical path being exactly known and being in accordance with the focal length of the lens, the exact speed necessary between the flowing copy and the film is known, and the various belts, sheaves, gears, or other driving means, are adjusted accordingly, this adjustment being determined by the ratio of the front focus to the back focus of the lens.

Also, by using the light reflecting surfaces, as herein described, a lens of longer focal length can be used, and as the necessary film and copy feeds are known, they can be adjusted accordingly.

Now, to attain the second object stated herein, that is to say, to facilitate the construction and adjustment of the cameras in production where, by alterations in the length of the optical path, correction can be made for the failure of the lens to measure up to its indicated focal length, the light reflecting surfaces 39 to 42, inclusive, are located in the relative position shown in Figure 1, so that instead of the short path indicated at 58, 59, the path will be as follows:

From the copy 16 lying in the focal plane in the space 17 (below the slit defined by the bottom of the light tunnel, or by any other suitable means) and illuminated by the lamps 60, the light beam traverses the vertical path 58, is reflected horizontally as shown at 61 by a reflecting surface such as the silvered prism 40, is then reflected in the vertical path indicated at 62 by the silvered prism 42, is reflected again horizontally in the path 63 by the silver prism 41 to the silvered prism 39 and vertically in the path 59 to the lens 18.

Now, by turning the knob 37 and thereby adjusting the casing 31, the lengths of the horizontal paths 61 and 63 may be varied, thereby varying the total length of the optical path comprised of the sections 58, 61, 62, 63 and 59 between the lens and the focal plane. It is not now necessary to adjust or correct the driving pulleys and other parts of the equipment, or to adjust the film speed and copy speed, (these speeds being set from some standard focal length of lens, say 40 mm.).

By the adjustment of knob 37 as just described, variations in the relative speeds of film and copy due to wear can also be compensated for.

By means of the adjustment of the length of the optical path as just described, critically exact definitions can be obtained with lenses of varying focal lengths without changing the distance between the lens and the copy, and without adjusting the relative film and copy speeds, thus greatly simplifying the construction, assembly and testing of cameras of the type described, and thus easily maintaining microfilm images in flow with the copy at all times. The result is the ability to produce in quantity an improved flow film camera in which the necessity for carefully selecting lenses of identical focal lengths is eliminated; and lenses as manufactured in quantity production having focal lengths coming within accepted manufacturing tolerances can be used without sacrificing critically exact definitions, and without the necessity of adjusting the parts involved in producing exact relative speeds between the copy and the film.

It will be observed that the lens 18 is fixed in position on the framework of the camera, so that its optical axis is perpendicular to its field of view. In other words, the axis of the lens is parallel to a vertical line perpendicular to the copy and passing through the center of the space to be photographed as defined by the upper and lower slits, the former being shown at 20, and the latter being defined by the lower end of light tunnel 29 or by a slit member properly positioned above the copy. The lens is therefore directly above and is pointed directly at the copy, the revertive path between lens and copy being straight and not including any mirrors or other reflecting surfaces when the surfaces 39 to 42, inclusive, are not used.

It will also be noted that all reflecting surfaces such as 39 to 42, inclusive, when used are in the light path between the copy and the lens on the front, or long-focus side thereof, and not between the lens and the film.

It will be understood that throughout this specification and the annexed claims when reference is made to the "front side," "front focus," "long focus," or "front focal plane," applicants mean that which is in front of the lens 18 and the focal plane at the space 17 where the object to be photographed is positioned. When applicants refer to the "back focus" of the lens, applicants mean in the rear of the lens 18 where the film 22 is positioned at the back focus thereof.

This invention is particularly valuable where the microfilm produced by a camera equipped therewith is enlarged or "blown up" to make prints the same size as the original copy from which the microfilm is made, or some dimensionally accurate variation thereof. Unless the microfilm is made to critically exact definition, the images thereon cannot be blown up to the original dimension of the copy. Without this invention, a camera may make a microfilm negative of an 8½" x 11" drawing which, when blown up will be 8½" x 10", or have some other distortion due to the departure of the lens from the standard focal length for which the film copy feed is designed. By the use of the invention, the microfilm will be made to critically exact definition and images thereon can be blown up to the exact size of the original copy, or to any size in exact ratio thereto.

What is claimed is:

1. In a photographic apparatus, the combination with a lens and a copy support mounted in said apparatus in the front focal plane of said lens, of a fixed beam-deflecting member lying across the optical path between said lens and copy support and adapted to angularly deflect the optical beam entering said lens, a second beam-deflecting member adapted to receive and angularly deflect the optical beam received from said first member, a third beam-deflecting member adapted to receive and angularly deflect the optical beam received from said second member, a fourth beam-deflecting member adapted to receive and angularly deflect the optical beam received from said third beam-deflecting member, all said members being located between said lens and copy support, and means for varying the length of the optical path between some of said members to vary the length of the optical path between said lens and copy support while said lens and support remain relatively fixed in said apparatus in relation to each other.

2. In a photographic device, a frame, a document support in said frame, a lens supported by said frame in spaced relation to and having a predetermined area of said support in its field of view, the axis of said lens being substantially perpendicular to the plane of said area, means carried by said frame for illuminating documents at least in said area, a first beam deflecting member on said frame and having a reflecting surface angularly cutting said axis and facing toward said area, a second beam deflecting member spaced apart from and forming an angle of substantially 90° with respect to said first member and having its reflecting surface cutting said axis and facing toward said lens, means spaced apart from said axis to one side thereof and including two members in fixed relation to each other and having reflecting surfaces disposed at an angle of substantially 90° with respect to each other, one of said last mentioned reflecting surfaces in said last means being positioned to receive beams from said first deflecting member and to deliver them to said second deflecting member via the other reflecting surface in said last means, whereby light reflected by said documents traverses a path substantially longer than the direct axial distance between said area and said lens, said first and said second deflecting members being individually supported on said frame and each being movable thereon to a position spaced apart from said axis for shortening said path to the direct axial distance between said area and said lens.

3. In a photographic apparatus having a lens, a copy support in said apparatus crossing the focal plane of the front focus of said lens, the optical axis of said lens being substantially perpendicular to the face of copy on said support, means for feeding film past said lens in the focal plane of the back focus thereof, said means including a support for said film adjacent the rear focal plane of said lens, a slit member between said lens and film, means defining a vertical optical path between said lens and copy support having a horizontal extension, beam deflecting means partly on said vertical path and partly in said extension for deflecting light reflected from the face of copy on said copy support laterally from said optical axis into and out of said extension and thence along said axis to said lens, whereby distance between the lens and the copy plus the length of the path in said extension traversed by said reflected light is substantially greater than the physical distance between said copy and said lens measured directly along the axis of said lens, those of said beam deflecting means on said vertical path being movably supported in said apparatus, whereby they may be moved into and out of said optical path at will.

4. In a photographic apparatus having a lens, a copy support mounted in said apparatus in the focal plane in the front focus of said lens, the optical axis of said lens being perpendicular to the face of copy on said support, means for feeding film past said lens in the focal plane of the back focus thereof, said means including a support for said film adjacent the rear focal plane of said lens, a slit member between said lens and film, a light-tight tunnel including a straight vertical portion extending from a point adjacent to the face of said copy to said slit member and including a lateral extension intermediate the ends of said straight portion, a first optical beam deflecting member in said tunnel for deflecting a beam from said copy face into said extension, a second optical beam deflecting member in said tunnel for receiving beams from said extension and directing them to said lens, plural optical beam deflecting means in said extension for receiving beams from said first deflecting member and for delivering them to said second deflecting member, said extension being formed of two parts in telescoped relation, one of said parts carrying said plural beam deflecting means, and means for moving one of said parts relative to the other for varying the length of the actual optical path between said lens and said copy.

5. In a photographic apparatus having a lens, a copy support mounted in said apparatus in the focal plane in the front focus of said lens, the optical axis of said lens being perpendicular to the face of copy of said support, means for feeding film past said lens in the focal plane of the back focus thereof, said means including a support for said film adjacent the rear focal plane of said lens, a slit member between said lens and film, a light-tight tunnel including a straight vertical portion extending from a point adjacent to the face of said copy to said slit member and including a lateral extension intermediate the ends thereof, a first optical beam deflecting member in said tunnel for deflecting a beam from said copy face into said extension, a second optical beam deflecting member in said tunnel for receiving beams from said extension and directing them to said lens, plural optical beam deflecting means in said extension for receiving beams from said first deflecting member and for delivering them to said second deflecting member, said extension being formed of two parts in telescoped relation, one of said parts carrying said plural beam deflecting means, and means for moving one of said parts relative to the other for varying the length of the actual optical path between said lens and said copy.

VERNEUR E. PRATT.
GEORGE F. GRAY.

REFERENCES CITED

The following references are of record in the file of this patent:

UNITED STATES PATENTS

| Number | Name | Date |
| --- | --- | --- |
| 1,553,980 | Caps | Sept. 15, 1925 |
| 1,644,781 | Holman et al. | Oct. 11, 1927 |
| 1,808,274 | Webster | June 2, 1931 |
| 1,894,004 | Rose | Jan. 10, 1933 |
| 2,100,967 | Levy | Nov. 30, 1937 |
| 2,158,903 | Knobel | May 16, 1939 |
| 2,195,699 | Johnson | Apr. 2, 1940 |
| 2,292,825 | Dilks, Jr. | Aug. 11, 1942 |

FOREIGN PATENTS

| Number | Country | Date |
| --- | --- | --- |
| 516,926 | Germany | Feb. 12, 1931 |
| 540,934 | Great Britain | Nov. 5, 1941 |